(12) United States Patent
Gupta et al.

(10) Patent No.: US 6,584,075 B1
(45) Date of Patent: Jun. 24, 2003

(54) EFFICIENT CACHING OF ROUTING INFORMATION FOR UNICAST AND MULTICAST CONNECTIONS

(75) Inventors: Amit Gupta, Mountain View, CA (US); Raphael Rom, Palo Alto, CA (US); Tony Hsiao, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 862 days.

(21) Appl. No.: 08/886,130

(22) Filed: Jun. 30, 1997

(51) Int. Cl.[7] ............................................... H04L 12/28
(52) U.S. Cl. ........................ 370/256; 370/351; 370/408
(58) Field of Search ................................. 370/238, 254, 370/255, 256, 351, 389, 396, 400; 709/238, 239, 240, 241

(56) References Cited

U.S. PATENT DOCUMENTS

| | | | | | |
|---|---|---|---|---|---|
| 4,987,536 A | * | 1/1991 | Humblet | ...................... | 370/238 |
| 5,117,422 A | * | 5/1992 | Hauptschein et al. | ........ | 370/389 |
| 5,233,604 A | * | 8/1993 | Ahmadi et al. | .............. | 370/400 |
| 5,291,477 A | * | 3/1994 | Liew | ............................ | 370/389 |
| 5,321,815 A | * | 6/1994 | Bartolanzo, Jr. et al. | ... | 370/351 |
| 5,933,425 A | * | 8/1999 | Iwata | ........................... | 370/351 |

* cited by examiner

Primary Examiner—Seema S. Rao
Assistant Examiner—Frank Duong
(74) Attorney, Agent, or Firm—Rosenthal & Osha L.L.P.

(57) ABSTRACT

A routing engine for a node controller of a switch or for a router provides enhanced routing for unicast and multicast connections by representing preferred routing trees, associated with different bandwidths and quality of service indications, as tables having, for each entry, a node identification, a parent node identification, a link identifier and ah effective distance by which a node identified by the node identification is separated from the controller or router. The routing engine adapts quickly to changes in network configurations, such as link failure, by quickly patching a table affected by the failure in order to maintain service until a new preferred routing tree can be calculated. Recalculations of preferred routing trees are avoided by using said table to determine whether a new link or a restored link could possibly provide a more cost effective route than that specified in the existing table.

23 Claims, 9 Drawing Sheets

| FLAG ⌐340 | INDEX (NODE NO.) ⌐300 | PARENT NODE ⌐310 | LINK ⌐320 | DISTANCE FROM SOURCE ⌐330 |
|---|---|---|---|---|
| | 1 | 1 | NULL | 0 |
| | 2 | 1 | A | 2 |
| | 3 | 2 | D | 3 |
| | 4 | 2 | E | 4 |
| | 5 | 1 | B | 1 |
| | 6 | 7 | N | 5 |
| | 7 | 5 | J | 3 |
| | 8 | 5 | K | 3 |
| | 9 | 5 | M | 2 |
| | 10 | 7 | O | 5 |
| | 11 | 0 | NULL | 0 |
| | 12 | 0 | NULL | 0 |
| | ⋮ | | | |

COMPLETE TRAVERSAL

TRAVERSAL TREE

| CANDI-DATE LINK (600) | CANDI-DATE NODE (610) | ADMINI-STRATIVE WEIGHT (620) | CANDIDATE NODE DISTANCE FROM SOURCE (630) | TOTAL COST (640) |
|---|---|---|---|---|
| G | 2 | 2 | 2 | 4 |
| H | 2 | 1 | 2 | 3 |
| I | 4 | 2 | 4 | 6 |
| J | 5 | 2 | DOWN | N/A |

EFFICIENT CACHING OF ROUTING INFORMATION FOR UNICAST AND MULTICAST CONNECTIONS

BACKGROUND OF THE INVENTION

1. Field of the Invention

The invention relates to switching systems and more particularly to the computation of routes for nodes of switching network.

2. Description of Related Art

Routing algorithms are known in the prior art for determining minimum cost routes from a source to a destination through A switching network.

Switching nodes, and network routers are also known which direct digital packets from an incoming port to an outgoing link which goes toward the destination.

The Problems

Route computation presents a difficult problem. It is computationally difficult and time consuming to determine the most cost effective routes through a switching network. Nevertheless, routing decisions need to be made quickly.

Network configurations can change quickly and unexpectedly when links go down or are restored or when new links are initiated. Nodes of a switching network need to be able to adapt quickly to avoid service deterioration when changes to network configuration occur.

SUMMARY OF THE INVENTION

One embodiment of the invention relates to a particularly convenient representation of network routing trees which permits routing decisions to be made with great speed and with relatively small amounts of processing power. The representation permits changes in network configuration to be accommodated in many instances with a quick patch to keep the network operational until a new routing table can be calculated. Unnecessary calculation of routing tables can be avoided when network configuration changes when the resulting change would not improve the routing tree. Improvement or not can be quickly determined using this representation.

Another embodiment of the invention relates to a route computation engine for performing routing calculations for a switching node.

Another embodiment of the invention relates to a router having one or more input ports, a plurality of output ports, and a controller. The controller directs digital information from the one or more input ports to one or more appropriate output port(s). The controller is also configured to maintain routing information in one or more tables with each entry in a table comprising a node identification, a parent node identification, a link identifier and an effective distance by which a node identified by the node identification is separated from a designated node.

Another embodiment of the invention relates to a switching system for providing digital communications including a plurality of switching nodes interconnected by digital communications links, a source of digital information connected to a first one of the switching nodes, and a destination for the digital information connected to a second one of the switching nodes, in which at least the first one of the switching nodes is configured with a routing table including, in each entry, a node identification, a parent node identification, a link identifier and an effective distance by which a node identified by the node identification is separated from the first one of the switching nodes.

Another embodiment of the invention is directed to a method of determining a unicast route from a source node to a destination node over a switching network, by storing a preferred routing tree linking each node of a switching network, in a table in at least one node, looking up a destination node in a table and determining a parent of the destination node, and if the parent is the source node, terminating the search, and otherwise if the parent is not the source node, continuing to look up parent nodes of each intervening node until the source node is reached. The determined route is then the set of parent nodes between the source node and the destination node.

Another embodiment of the invention relates to a method of determining a multicast route from a source node to a plurality of destinations, by determining a route between the source node and a first destination and recording the route as a first partial list of nodes constructed by beginning with the destination node at the center and adding a next parent node to each end of the list until the source node is reached, determining a partial list of nodes for a next destination in the same way until a node is reached which is on the first list, determining a partial list of nodes for each destination in the same way until each destination has a partial list of nodes constructed, and patching in each partial list of nodes into the previous partial list of nodes until all partial lists of nodes have been patched into a single list of nodes. The single list of nodes represents a round trip traversal of all nodes in a multicast tree.

Another embodiment of the invention relates to a method of patching a preferred (low cost) routing tree represented as a table when a link between a first node of a switching network and a second node fails, which results in partitioning the preferred tree into a first partial tree and a second partial tree by using a list of network links to determine all nodes which connect to a node on the second partial tree at the end of the link, identifying nodes on the first partial tree using an effective distance to source field in the table, selecting a replacement link running between a node on the first tree and the node on the second partial tree at the end of the link, and overwriting in the table an entry for the failed link with an entry for the replacement link.

Another embodiment of the invention relates to a method of determining whether recalculation of a minimum cost tree is necessary when a link having a connection to a first node at a first end and a connection to a second node at a second end becomes available, by determining the effective distance from a source node to the first node using a table, determining the effective distance from the source node to the second node using a table, and recalculating the minimum cost tree only if the distance from a source node to the second node is greater than the sum of the distance from the source node to the first node plus the effective distance of the link.

Other aspects of the invention relate to computer program products for carrying out the techniques of the invention and to the transmission of such computer program products over a network.

The foregoing and other features, aspects and advantages of the present invention will become more apparent from the following detailed description of the present invention when taken in conjunction with the accompanying drawings.

BRIEF DESCRIPTION OF THE DRAWINGS

The objects, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1:
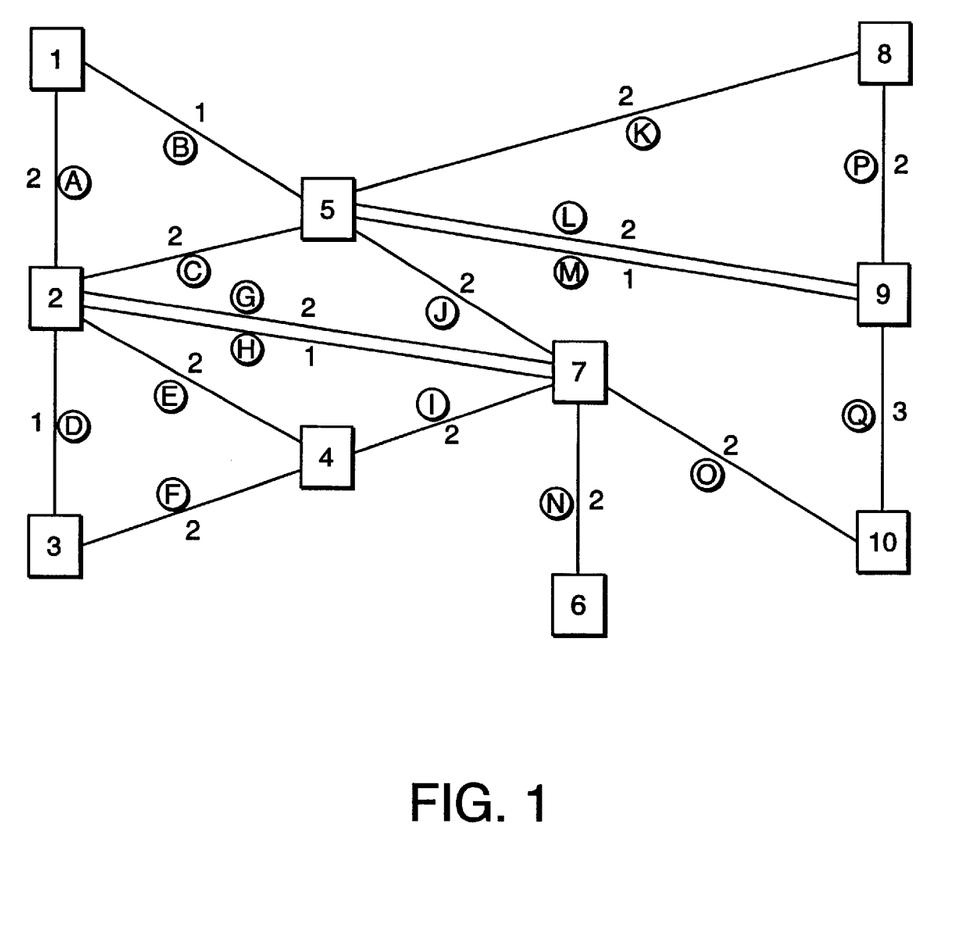
FIG. 1 is a block diagram of a digital network equipped at a node with a routing engine in accordance with the invention.

FIG. 1 is a block diagram of a digital network having nodes equipped with routing engines in accordance with the invention. A plurality of nodes, 1–10, are connected together by communication links A–Q in the manner illustrated. Associated with each link, is an administrative weight or an effective cost incurred by a quantum of digital information, such as a packet, traversing that link. Administrative weight or cost may reflect a measure of an underlying link parameter, such as delay, or may reflect a network administrator's preferences in routing. For example, the network administrator may find a particular link from one node to another node to be less expensive (e.g. in terms of payment to a common carrier) than another link. The network administrator would therefore prefer to route traffic over the less expensive link to the extent that capacity was available. These effective costs or administrative weights can be utilized in routing algorithms for determining the minimum cost routing from a particular node, in this case, node 1, to every other node in the network.

Figure 7A:
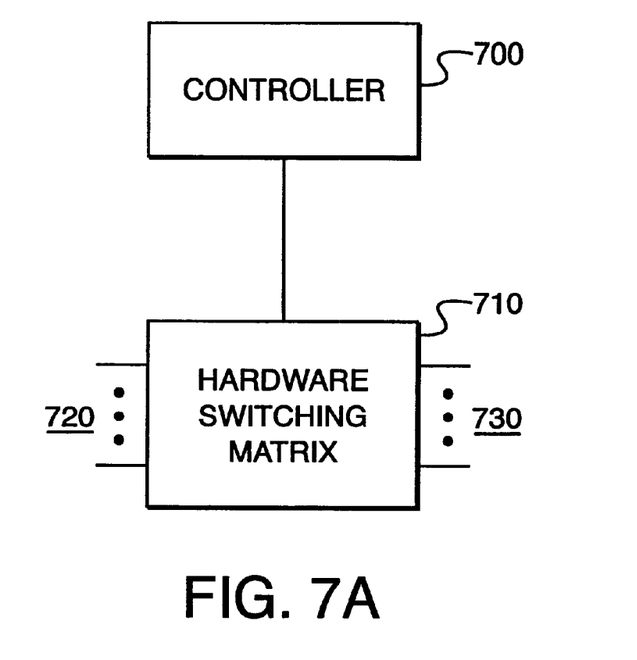
FIG. 7A is a block diagram of an exemplary digital switch used at a node of the switching network shown in FIG. 1.
Figure 7B:
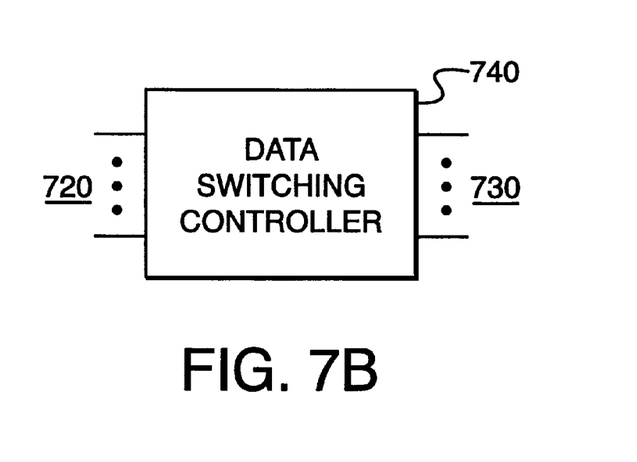
FIG. 7B is a block diagram of a router suitable for use at a node of the network shown in FIG. 1.
Figure 8A:
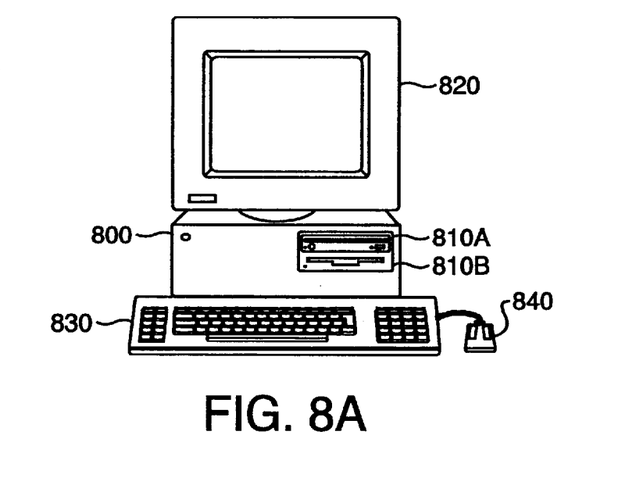
FIG. 8A illustrates a computer of a type suitable for carrying out the invention.
Figure 8B:
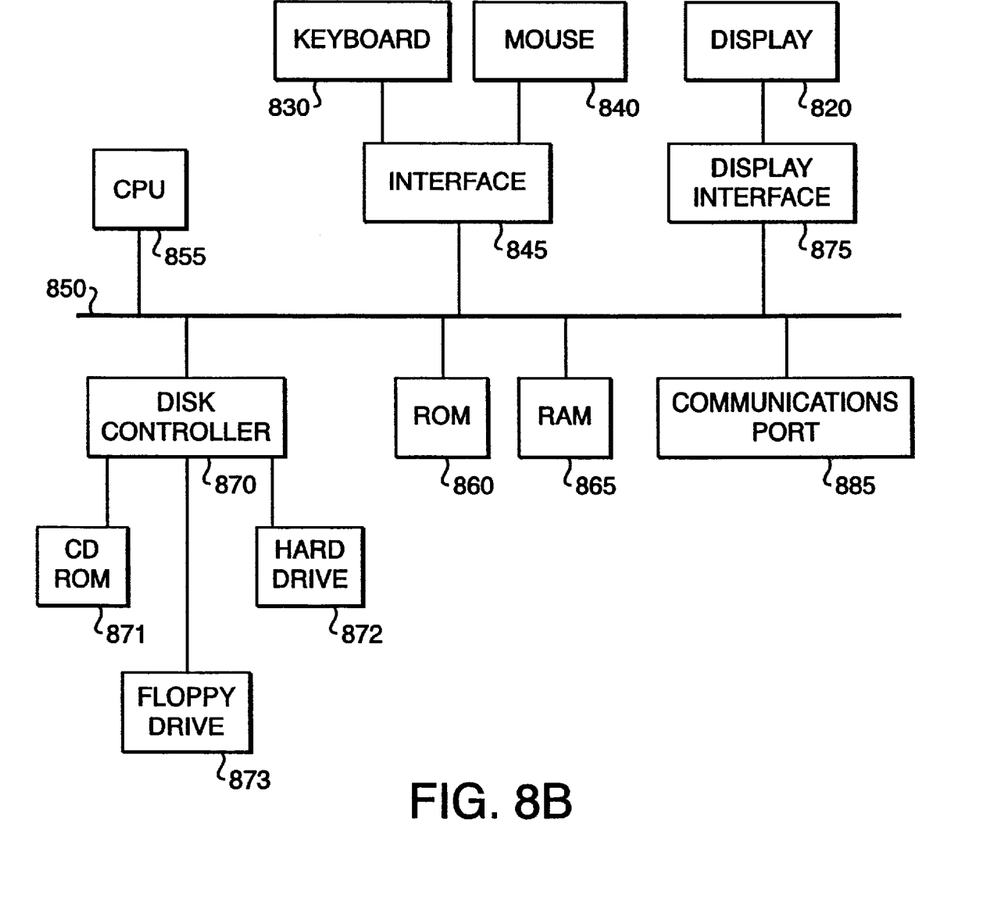
FIG. 8B illustrates a block diagram of the computer of FIG. 8A.

The nodes of the network shown in FIG. 1 may be digital switches, such as shown in FIG. 7A, routers such as shown in FIG. 7B or a computer such as shown in FIG. 8B with multiple communications ports. What is important is that the node be equipped with a matching element for directing incoming digital data from its input port to an appropriate output port.

Figure 2:
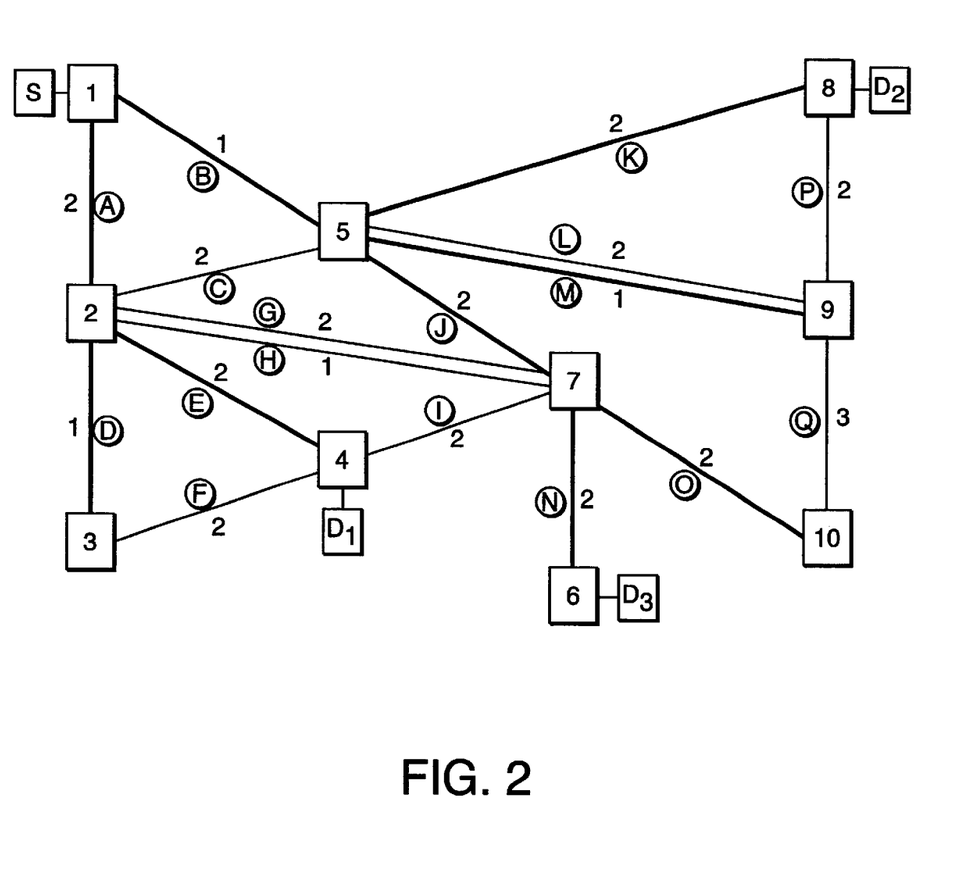
FIG. 2 is a block diagram of the network of FIG. 1 showing a minimum cost routing tree for routes originating at node 1.

FIG. 2 is a block diagram of the network of FIG. 1 showing a minimum cost routing tree for routes originating at node 1. The links of the network shown in FIG. 1 which form part of a minimum cost routing tree are shown with a thick line. The significance of the minimum cost routing tree is that the least expensive route from node 1 to any node in the network is predetermined. It is predetermined by performing an extensive calculation utilizing information available about the nodes and the links of the network. Thus, when a source user S, connected to node 1, desires to send information to a destination user D3, connected to node 6, the preferred route, shown on the minimum cost tree of FIG. 2 utilizes links B, J and N. Any other route between node 1 and node 6 would be no less expensive in terms of effective costs. The minimum cost route utilizing the link specified from node 1 to node 6 results in an effective cost of 1+2+2=5. If, for example, an alternate route had been selected, using links A, G and N, the effective would have been 2+2+2=6. Therefore, the minimum cost route is preferred. Destinations D1 and D2 shown in FIG. 2 will be discussed more hereinafter.

Although a minimum cost routing tree is used in the exemplary embodiments disclosed herein, in practice, the tree need not be a minimum cost tree. It is often sufficient that the routing tree be "good" or "preferred" rather than strictly optimal.

Figure 3:
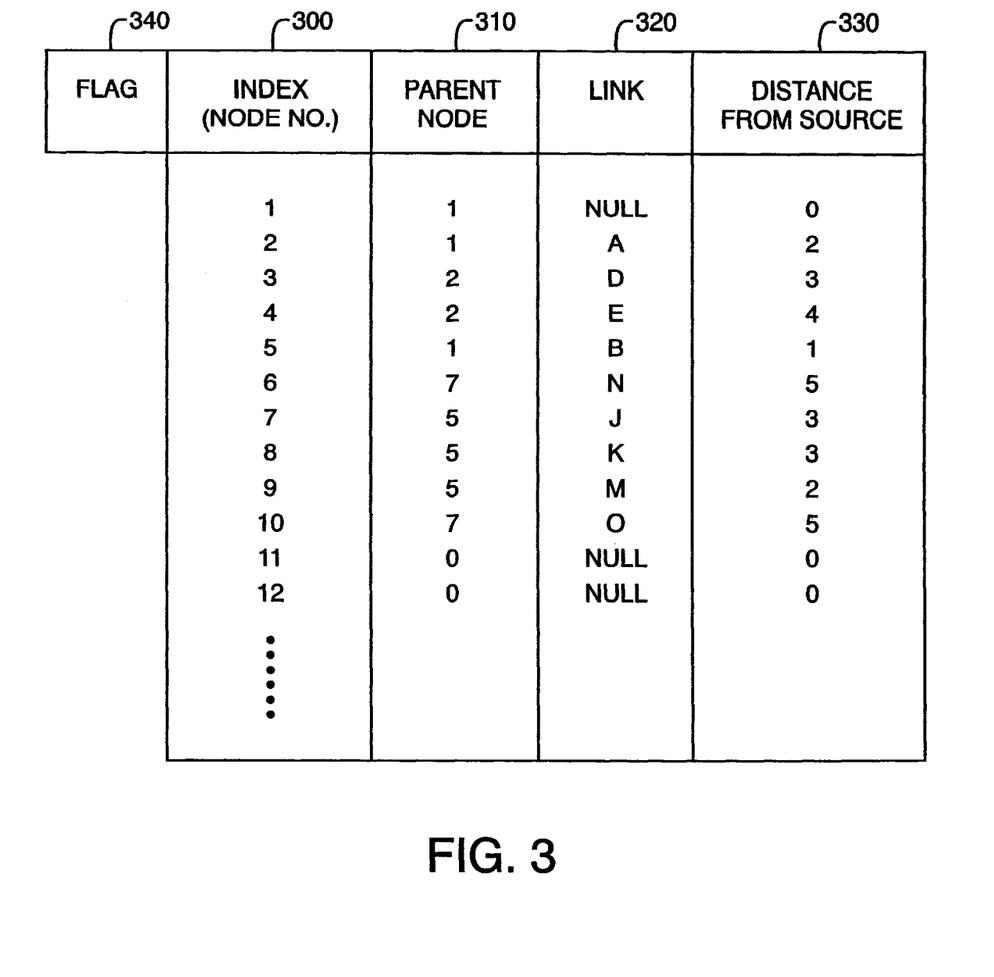
FIG. 3 is a table for representing the minimum cost routing tree illustrated in FIG. 2.

FIG. 3 is a table for representing the minimum cost routing tree illustrated in FIG. 2. The table shown in FIG. 3 is a table which would be stored in the route computation engine for such as found at a controller or router at node 1, and lists all nodes that are reachable from node 1. Note that some nodes may not be reachable by virtue of constraints such as a constraint on link capacity. The table is used to make routing decisions for the node. Route computation may also be performed centrally and routing tables distributed to the nodes.

The table shown in FIG. 3 includes column 300 in which each node in the network is listed. Associated with each entry in the table, is a parent node column 310. Thus, when considering any node in the network, identified by an entry in column 300, the parent of that node is listed in column 310. parent of a node, as can be seen from the minimum cost tree shown in FIG. 2, is the next node on the minimum cost tree going toward the node on which the table is maintained; in this example, node 1. The specific link utilized for the minimum cost tree is listed in column 320. Column 330 of the table lists a node's effective distance from the source or the sum of the administrative weights of the links going from the source node, in this case, node 1, to the nodes specified in column 300. Note that when a node is not operational (or connected), such as nodes 11 and 12, no parent node is listed and the distance from the source has no meaning; parent node value of 0 is reserved for this instance. Note that the source node for a particular routing table is its own parent. See the entry for node 1 in FIG. 3. The minimum cost tree storage may also include a flag 340 for marking the table stale, when conditions change.

An example of route calculation involving a point to point connection will now be described with reference to FIGS. 2 and 3. The source node S at node 1 (FIG. 2) desires to connect to destination D3 at node 6. Node 1 needs to calculate a route to node 6 in order to set up the connection. Node 1 goes to the table shown in FIG. 3, looks up node 6, the destination node, and finds that the parent node of node 6 is node 7. Node 1 then looks up node 7 and discovers that its parent is node 5. Node 1 then looks up the parent of node 5 and finds that it is node 1. Thus, by quick references to the table shown in FIG. 3, a unicast route can be determined which follows the minimum cost tree. That route, in this case, is the route 1-5-7-6. Thus, a route from a source node to a destination can be quickly and readily determined using the table shown in FIG. 3.

Figure 4A:
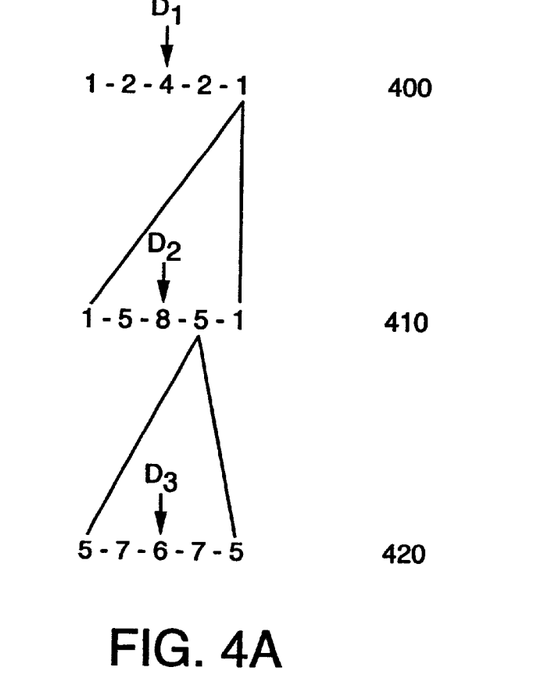
FIG. 4A illustrates the use of the table of FIG. 3 for construction of a multicast route.

A more difficult routing problem is the creation of a multicast routing tree. FIG. 4A illustrates the use of the table of FIG. 3 for construction of a multicast route. As shown in FIG. 2, the source at node 1 desires to send a multicast broadcast to destinations D1, D2 and D3 which are respectively located on node 4, node 8 and node 6. Calculation of a multicast tree is illustrated in FIG. 4. Starting with destination D1, the node associated with D1 is node 4. Going to the table of FIG. 3, one determines that parent of node 4 is node 2 and the parent of node 2 is node 1. This set of relationships is represented by placing the destination node, node 4, at the center of a series of links and by adding each node between the destination D1 and the source node 1 on both sides of the centered destination node resulting in a partial tree 400 of 1-2-4-2-1.

A partial tree for destination D2 is then constructing by placing the destination node 8 at the center. By referring to the table shown in FIG. 3, the parent of node 8 is node 5. Node 5 is not listed on partial tree 400. However, the parent of node 5 is node 1, which is listed on the partial tree 400. Thus, a partial tree for destination D2 is constructed (410) and results in a node list of 1-5-8-5-1.

A partial node tree for destination D3 is similarly constructed (420). D3 is located at node 6 and node 6 is placed at the center of a partial tree list. Referring to table 3, one can determine that the parent of node 6 is node 7. Node 7 however is not located on any partial tree constructed to this point. However, the parent of node 7 is node 5. Node 5 is located on partial tree 410.

The partial trees 400, 410 and 420 are combined in the manner shown. That is, partial sub-tree 410 is inserted in lieu of the right hand version of node 1 shown in partial tree 400. Similarly, partial tree 420 is substituted for the righthand most version of node 5 in partial tree 410. The resulting node list is 1-2-4-2-1-5-8-5-7-6-7-5-1.

Figure 4B:
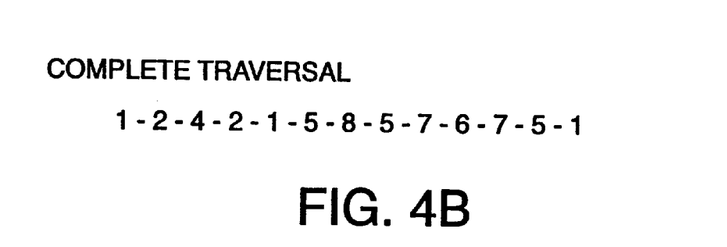
FIG. 4B shows an ordered list of nodes which constitute a complete traversal of a multicast routing tree developed as shown in FIG. 4A.
Figure 4C:
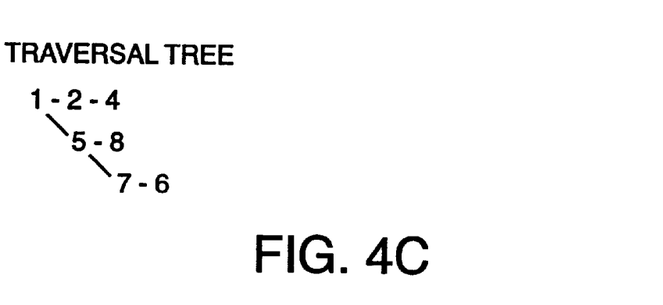
FIG. 4C shows the multicast tree resulting from the process described in FIGS. 4A and 4B.

FIG. 4B shows an ordered list of nodes which constitute a complete traversal of a multicast routing tree developed as shown in FIG. 4A. The list of nodes just recited is a description of a complete traversal of a spanning tree which connects all of the destinations. The path followed by such a complete traversal is illustrated by pursuing the nodes listed in sequence. It starts with source node 1 goes out to the first destination node 4, backs up to node 1 goes to the next destination node 8 backs up to node 5 goes out to the next destination node 6 and then returns to the source node. A complete traversal is analogous to drawing a line around the outer periphery of the spanning trees starting with the source node and returning to the source node. FIG. 4C shows the multicast tree resulting from the process described in FIGS. 4A and 4B.

Figure 5:
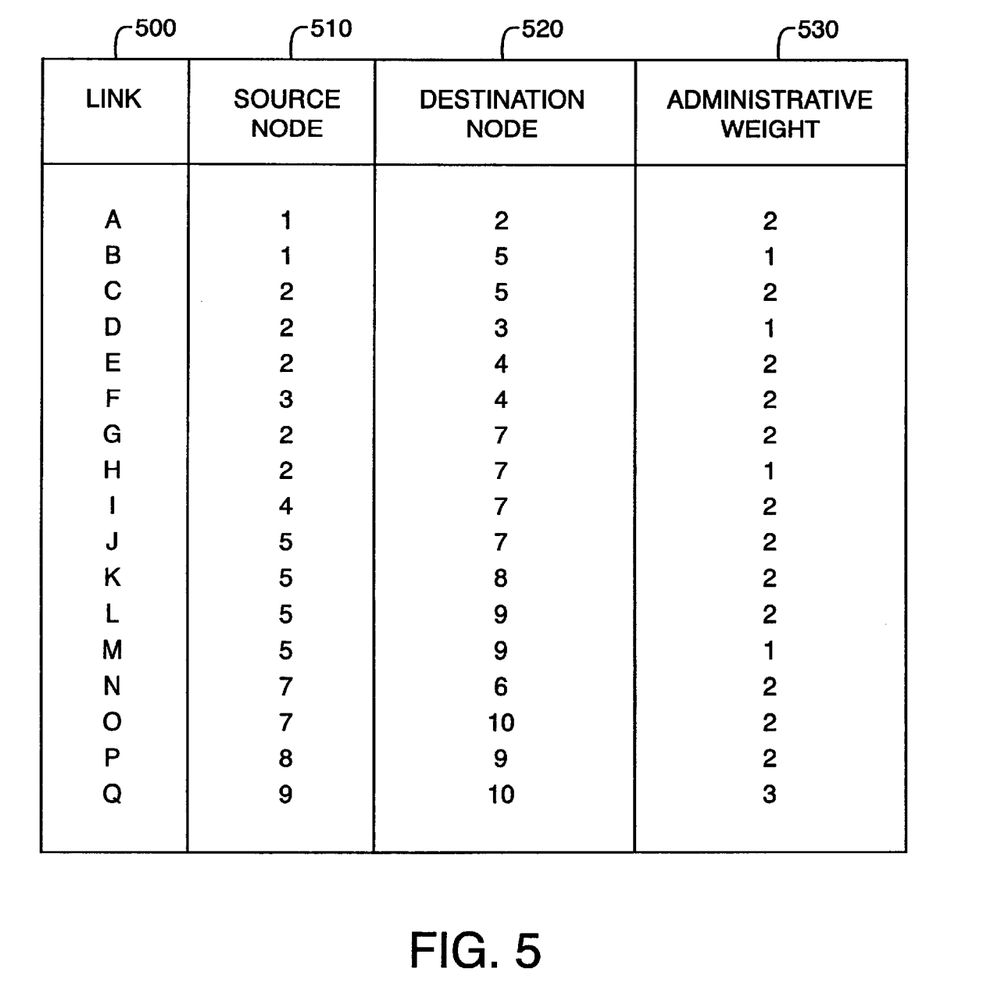
FIG. 5 is a list of network links used to construct a patch to the table of FIG. 3.

FIG. 5 is a list of network links used to construct a patch to the table of FIG. 3. The list of network links contains each link of the network specified in column 500. Associated with each link is a source node, found in column 510, and a destination node, found in column 520. In addition, the administrative weight, found in column 530, for the link is included in the table.

Referring to FIG. 2, assume that link J, which connects node 5 with node 7, goes down by virtue of a failure. The minimum cost tree shown in FIG. 2 is partitioned into two sub-trees referred to, for convenience, as a left tree and a right tree. The left sub-tree contains nodes 1, 2, 3, 4, 5, 8 and 9. The right sub-tree contains nodes 7, 6 and 10. At this point, with link J down, there is no way to get from the source node 1 to nodes 6, 7 and 10 of the network using the previously computed minimum cost tree. However, there are other links in the network which are potential candidates for routing the traffic which was previously handled by failed link J.

In an attempt to reestablish a good low cost tree in the quickest possible time, one looks for each node which connects with node 7 as a destination. Looking at the list of network links of FIG. 5, one can see that links G, H, I and J are each listed as terminating at node 7.

In addition, links N and O are listed as originating at node 7. If the links are bidirectional, then both sets of links must be considered as candidate links for a patch. Whether a node is on the left tree or the right tree can be determined readily from table 3. If the distance from the source is less than the distance from node 7, a node is on the left tree. If it is greater than the distance for node 7, it may be on the right tree. As an alternative, we can zero out node 7's parent node information. When considering candidate nodes, see if they have a path to the source (which does not go through the recently stranded node—node 7 in this case). In the example shown in FIG. 6, links N and O have been previously rejected because their "source node" shown in FIG. 5 point back to node 7.

Figure 6:
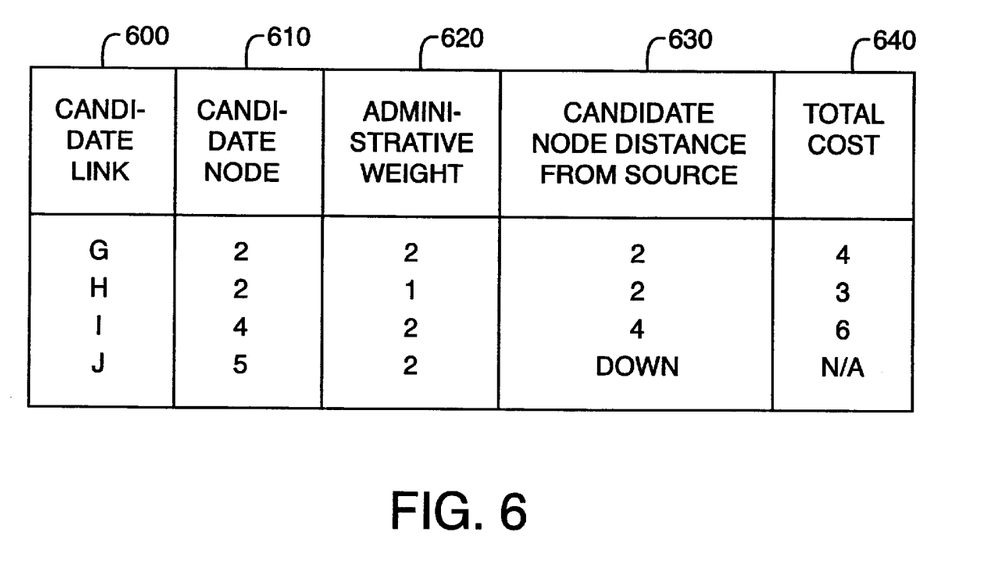
FIG. 6 is a table showing candidate links for a patch to the table of FIG. 3.

As shown in FIG. 6, each candidate link 600 has a candidate source node listed in column 610, an administrative weight, listed in 620 and a candidate source node distance from the source 630 determined from table 3. A total cost for each of the candidate links to reach node 7 is listed in column 640. As shown in FIG. 6, candidate link J is not available because it is the link which in this example went down. However, considering candidate links G, H and I, it is clear that link H has the lowest total cost required to reach node 7. Thus, preferably, candidate link H would be selected to serve as an alternative to the downed link J. To effectuate the patch, the table entry or row for node 7 in the minimum cost tree table of FIG. 3 is replaced with an index value 7, a parent node 2, the link identification H and the distance 3. In other words, the node information for, candidate link H is substituted for the failed link J information in the minimum cost tree table.

Thus, utilizing the table representation, a quick patch can generally be found for a failed link, which can serve for routing decisions until such time as a complete recalculation of the minimum cost tree can be accomplished. Thus, traffic may continue to be routed during the recalculation of the minimum cost tree.

Two examples will illustrate another use of the route calculations, in accordance with the invention. Assume that the network shown in FIG. 2 is completely operational except that link H has been inoperative for six months. Assume now that link H is restored. Link H has an administrative weight of 1. The question is whether the existence of link H which has now come on-line will effect the minimum cost routing so as to require recomputation. To make this determination one compares the administrative weight for node 7 (which equals 3), obtained from the minimum tree table with the administrative weight for node 2 from the table plus the administrative weight of link H. Since the total cost of getting to node 7 is no smaller utilizing newly reestablished link H, than when using the routing the shown by the minimum cost tree, there is no need to recompute the minimum cost tree table.

As a second example, assume that a new link is installed between node 1 and node 7 with an administrative weight equal to 1. By comparing the administrative weight for node 7 from the table (equals 3) with the administrative weight for node 1 from the table (equals 0) plus the administrative weight of the new link (equals 1), one can see that the direct link from node 1 to node 7 with administrative cost of 1 is less than the existing routing on the minimum cost tree table which has a cost of 3. As a result, the establishment of the new link will effect the minimum tree table and thus require recalculation. As a result, the minimum tree table is marked as stale by flagging field 340 shown in FIG. 3.

As the examples show, utilizing the representation shown in FIG. 3 greatly facilitates the determination of routing decisions and facilitates the adaptation of network routing in response to changing network conditions.

FIG. 7A is a block diagram of an exemplary digital switch used at a node of the network shown in FIG. 1. The switching node typically comprises a hardware switching matrix 710 for establishing connections between input ports 720 and output ports 730. The connections are established by a controller 700 which performs routing calculations as described above in a routing process or routing engine and handles all functions associated with connection set up and tear down. In the instance shown in FIG. 7A, data switching occurs over an external hardware device run by controller 700.

FIG. 7B is a block diagram of a router used at a node of the network shown in FIG. 1. Not all routers have separate hardware switching matrixes 710. As shown in FIG. 7B, input ports 720 are connected to output ports 730 using a data switching controller 740. In this implementation, the data is routed over the CPU bus for the controller to the output ports. There is a disadvantage with routing network traffic over the same bus utilized for controller calculations. That disadvantage is simply contention for the bus. In the configuration shown in FIG. 7A, network traffic is routed over a separate switching matrix which avoids congesting the controller bus and leaving it free for other calculations. Either type of switching node may be appropriate for a particular network, depending on traffic and other design considerations.

FIG. 8A illustrates a computer of a type suitable for carrying out the invention either as a controller for a switching matrix, FIG. 7A, as a router (FIG. 7B) or with plural communications ports as a switching element. Viewed externally in FIG. 8A, a computer system has a central processing unit 800 having disk drives 810A and 810B. Disk drive indications 810A and 810B are merely symbolic of a number of disk drives which might be accommodated by the computer system. Typically, these would include a floppy disk drive such as 810A, a hard disk drive (not shown externally) and a CD ROM drive indicated by slot 810B. The number and type of drives varies, typically, with different computer configurations. The computer has the display 820 upon which information is displayed. A keyboard 830 and a mouse 840 are typically also available as input devices. Preferably, the computer illustrated in FIG. 8A is a SPARC workstation from Sun Microsystems, Inc.

When used as a controller for a switching matrix or as a router, I/O devices such as a CRT, keyboard or mouse may not be connected during normal operation. However, they may be connected during maintenance. In a switching center installation the computer may be installed rack mounted rather than in the stand alone configuration illustrated.

When used as a router, the I/O devices will normally not be connected except during maintenance. The router will typically operate in stand alone mode with its own case. When configured as a router, a plurality of communications interfaces 885 will normally be provided, one for each port.

FIG. 8B illustrates a block diagram of the internal hardware of the computer of FIG. 8A. A bus 850 serves as the main information highway interconnecting the other components of the computer. CPU 855 is the central processing unit of the system, performing calculations and logic operations required to execute programs. Read only memory (860) and random access memory (865) constitute the main memory of the computer. Disk controller 870 interfaces one or more disk drives to the system bus 850. These disk drives may be floppy disk drives, such as 873, internal or external hard drives, such as 872, or CD ROM or DVD (Digital Video Disks) drives such as 871. A display interface 875 interfaces a display 820 and permits information from the bus to be viewed on the display. Communications with external devices can occur over communications port 885.

Figure 8C:
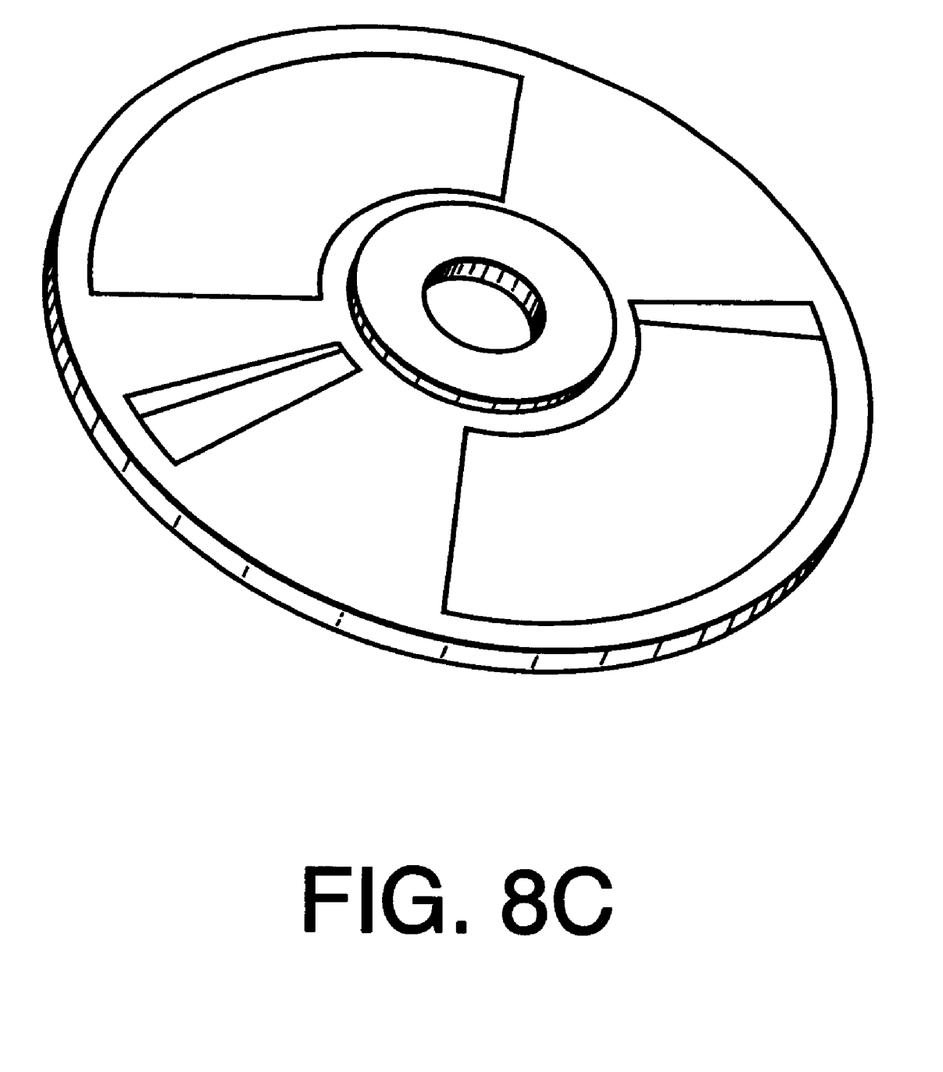
FIG. 8C illustrates an exemplary memory medium containing one or more programs usable with the computer of FIG. 8A.

FIG. 8C illustrates an exemplary memory medium which can be used with drives such as 873 in FIG. 8B or 810A in FIG. 8A. Typically, memory media such as a floppy disk, or a CD ROM, or a Digital Video Disk will contain the program information for controlling the computer to enable the computer to perform its functions in accordance with the invention. Program and data information from such media is transmitted, in accordance with the invention, lover a transmission link in the form of a carrier wave.

In an exemplary implementation, a routing engine maintains 15 tables of the type shown in FIG. 3. Five for each of 3 bandwidths (e.g. small—1 Mbps; medium—5 Mbps and large—15 Mbps). For each bandwidth, one of those 5 tables contains routing for a particular Quality of Service (QOS) indicator. The indicators include constant bit rate, real time variable bit rate, non-real time variable bit rate, available bit rate and unspecified bit rate.

When a request is received for a connection to a destination, it will specify a bandwidth and an optional particular QOS. Routing to the destination is determined by selecting the appropriate routing table for the bandwidth and QOS desired, and determining a route as described herein.

There have been disclosed particularly efficient routing mechanisms for handling routing decisions in a network environment which are computationally efficient both by avoiding unnecessary computations and by requiring fewer operations to make routing decisions.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. Computer apparatus for determining routing at a node of a network, comprising:
   a. one or more input ports;
   b. a plurality of output ports:
   c. a controller for directing digital information from said one or more input ports to an appropriate output port, said controller configured to maintain routing information in one or more tables, each entry in each of the one or more tables comprising a node identification, a parent node identification, a link identifier and an effective distance by which a node identified by said node identification is separated from a designated node.

2. The computer apparatus of claim 1 in which said one or more tables contains a representation of a minimum cost tree.

3. The computer apparatus of claim 1 in which said computer apparatus maintains routing information in a plurality of tables, one or more for each of a plurality of quality of service levels.

4. The computer apparatus of claim 1 in which quality of service is established by specifying values for bandwidth, and one of constant bit rate, real time variable bit rate, non-real time variable bit rate, available bit rate and unspecified bit rate.

5. A switching system for providing digital communications, comprising:
   a. a plurality of switching nodes interconnected by digital communications links;
   b. a source of digital information connected to a first one of said switching nodes; and
   c. a destination for said digital information connected to a second one of said switching nodes;
   in which at least said first one of said switching nodes is configured, with a routing table including, in each entry, a node identification, a parent node identification, a link identifier and an effective distance by which a node identified by said node identification is separated from said first one of said switching nodes.

6. A method of determining a unicast route from a source node to a destination node over a switching network, comprising the steps of:
   a. storing a preferred routing tree linking each node of a switching network, in a table in at least said source node;
   b. looking up a destination node in a table and determining a parent of said destination node;
   c. if said parent is said source node, terminating said search; and
   d. if said parent is not said source node, continuing looking up parent nodes for each intervening node until said source node is reached; the determined route then including the set of parent nodes between said source node and said destination node.

7. A method of determining a multicast route from a source node to a plurality of destinations, comprising the steps of:
   a. determining a route between said source node and a first destination and recording said route as a first partial list of nodes constructed by beginning with said destination node at the center and adding a next parent node to each end of the list until the source node is reached;
   b. determining a partial list of nodes for a next destination in the same way until a node is reached which is on the first list;
   c. determining a partial list of nodes for each destination in the same way until each destination has a partial list of nodes constructed; and
   d. patching in each partial list of nodes into the previous partial list of nodes until all partial lists of nodes have been patched into a single list of nodes, said single list of nodes represents a round trip traversal of all nodes in a multicast tree.

8. A method of patching a preferred routing tree represented as a table when a link between a first node of a switching network and a second node fails resulting in partitioning said preferred routing tree into a first partial tree and a second partial tree comprising the steps of:
   a. using a list of network links to determine all nodes which connect to a node on the second partial tree at one end of said link;
   b. identifying nodes on said first partial tree using an effective distance to source field in said table;
   c. selecting a replacement link running between a node on said first tree and said node on the second partial tree at the end of said link; and
   d. overwriting in said table an entry for the failed link with an entry for said replacement link.

9. The method of claim 8 in which said patching occurs before recalculation of a new preferred routing tree is completed.

10. The method of claim 9 in which routing is determined based on a patched preferred routing tree as soon as the patch is completed.

11. The network of claim 8, in which the replacement link is selected based on the minimum effective distance to the source node from said node on the second partial tree if a candidate replacement node were to be the replacement node.

12. A computer program product comprising:
   a. a memory medium;
   b. a computer program, stored on said memory medium, said computer program comprising instructions for determining a unicast route from a source node to a destination node over a switching network, by storing a preferred routing cost tree linking each node of a switching network, in a table in at least one computer apparatus, looking up a destination node in a table and determining a parent of said destination node if said parent is said source node, terminating said search; and if said parent is not said source node, continue looking up parent nodes of each intervening node until said source node is reached; in which the determined route is the set of parent nodes between said source node and said destination node.

13. The computer program product of claim 12, in which said computer program is transmitted from said memory medium over a network interface.

14. A computer program product comprising:
   a. a memory medium;
   b. a computer program, stored on said memory medium, said computer program comprising instructions for determining a multicast route from a source node to a plurality of destinations by determining a route between said source node and a first destination and recording said route as a first partial list of nodes constructed by beginning with said destination node at the center and adding a next parent node to each end of the list until the source node is reached; determining a partial list of nodes for a next destination in the same way until a node is reached which is on the first list; determining a partial list of nodes for each destination in the same way until each destination has a partial list of nodes constructed; and patching in each partial list of nodes into the previous partial list of nodes until all partial lists of nodes have been patched into a single list of nodes, said single list of nodes represents a round trip traversal of all nodes in a multicast tree.

15. The computer program product of claim 14, in which said computer program is transmitted from said memory medium over a network interface.

16. A computer program product comprising:
   a. a memory medium;
   b. a computer program, stored on said memory medium, said computer program comprising instructions for patching a preferred routing tree represented as a table when a link between a first node of a switching network and a second node fails, which results in partitioning said preferred routing tree into a first partial tree and a second partial tree by using a list of network links to determine all nodes which connect to a node on the second partial tree at the end of said link; identifying nodes on said first partial tree using an effective distance to source field in said table; selecting a replacement link running between a node on said first tree and said node on the second partial tree at the end of said link overwriting in said table an entry for the failed link with an entry for said replacement link.

17. The computer program product of claim 16, in which said computer program is transmitted from said memory medium over network interface.

18. A computer data signal embodied in a carrier wave and representing a sequence of instructions which, when executed by one or more processors, causes the one or more processors to use a routing table including, in each entry, a node identification, a parent node identification, a link identification and an effective distance by which a node identified by said node identification is separated from a source node.

19. A switching system for providing digital communications, comprising:
   a. a plurality of switching nodes interconnected by digital communications links;
   b. a source of digital information connected to a first one of said switching nodes; and
   c. a destination for said digital information connected to a second one of said switching nodes;
   in which at least one processor of said switching system is configured with a routing table including, in each entry, a node identification, a parent node identification, a link identifier and an effective distance by which a node identified by said node identification is separated from said first one of said switching nodes.

20. Computer apparatus for determining routing for a node of a network, comprising:
   a processor for calculating routing of digital information from at least one node of a network from a source node to a destination node, said processor configured to maintain routing information in one or more tables for a node, each entry in each of the one or more tables comprising a node identification, a parent node identification, a link identifier and an effective distance by which a node identified by said node identification is separated from a designated node.

21. The computer apparatus of claim 20 in which said one or more tables contains a representation of a minimum cost tree.

22. The computer apparatus of claim 20 in which said processor maintains routing information in a plurality of tables, one or more for each of a plurality of quality of service levels.

23. The computer apparatus of claim 20 in which quality of service is established by specifying values for bandwidth, and one of constant bit rate, real time variable bit rate, non-real time variable bit rate, available bit rate and unspecified bit rate.

* * * * *